United States Patent [19]

Eichenlaub

[11] Patent Number: 5,428,366
[45] Date of Patent: Jun. 27, 1995

[54] FIELD SEQUENTIAL COLOR ILLUMINATION SYSTEM FOR LIQUID CRYSTAL DISPLAY

[75] Inventor: Jesse B. Eichenlaub, Penfield, N.Y.

[73] Assignee: Dimension Technologies, Inc., Rochester, N.Y.

[21] Appl. No.: 24,670

[22] Filed: Mar. 1, 1993

Related U.S. Application Data

[63] Continuation-in-part of Ser. No. 942,718, Sep. 9, 1992, Pat. No. 5,410,345.

[51] Int. Cl.⁶ .............................................. G09G 3/36
[52] U.S. Cl. .................................... 345/102; 345/88; 348/59
[58] Field of Search .............. 340/784, 795; 358/88, 358/3; 348/42, 51, 59; 345/88, 102

[56] References Cited

U.S. PATENT DOCUMENTS

| | | | |
|---|---|---|---|
| 3,878,329 | 4/1975 | Brown | 358/88 |
| 4,756,601 | 7/1988 | Schröder | 358/88 |
| 4,772,885 | 9/1988 | Uehara | 345/102 |
| 4,872,750 | 10/1989 | Morishita | 358/3 |
| 4,907,862 | 3/1990 | Suntola | 340/784 |
| 4,978,952 | 12/1990 | Irwin | 340/795 |
| 5,036,385 | 7/1991 | Eichenlaub | 358/3 |
| 5,093,652 | 3/1992 | Bull | 345/102 |
| 5,121,233 | 6/1992 | Spencer | 345/102 |
| 5,122,791 | 6/1992 | Gibbons | 345/102 |
| 5,128,782 | 7/1992 | Wood | 345/102 |
| 5,233,338 | 8/1993 | Surguy | 345/88 |
| 5,337,068 | 8/1994 | Stewart | 345/102 |
| 5,359,345 | 10/1994 | Hunter | 345/102 |

FOREIGN PATENT DOCUMENTS

0478186  4/1992  European Pat. Off. ............ 345/88

Primary Examiner—Curtis Kuntz
Assistant Examiner—Minsun Oh
Attorney, Agent, or Firm—Cumpston & Shaw

[57] ABSTRACT

A field sequential color illumination system for liquid crystal displays is described which focuses light from a plurality of small point like or line like light sources into subregions of pixels of an LCD by a fly's eye lens, in such a manner that at any given time, red, blue, and green light spots are focused simultaneously into different pixels. Furthermore, during each subsequent field, light spots are focused into different sub sections of each pixel in such a way that each pixel receives red, green, and blue illumination sequentially during each set of three fields. During each field, each pixel is addressed and made to display the appropriate transmittance level to display the appropriate red, green, or blue color level for its location on the red, blue, or green color component of the image just prior to illumination of a sub region by a red, green, or blue light source.

25 Claims, 14 Drawing Sheets

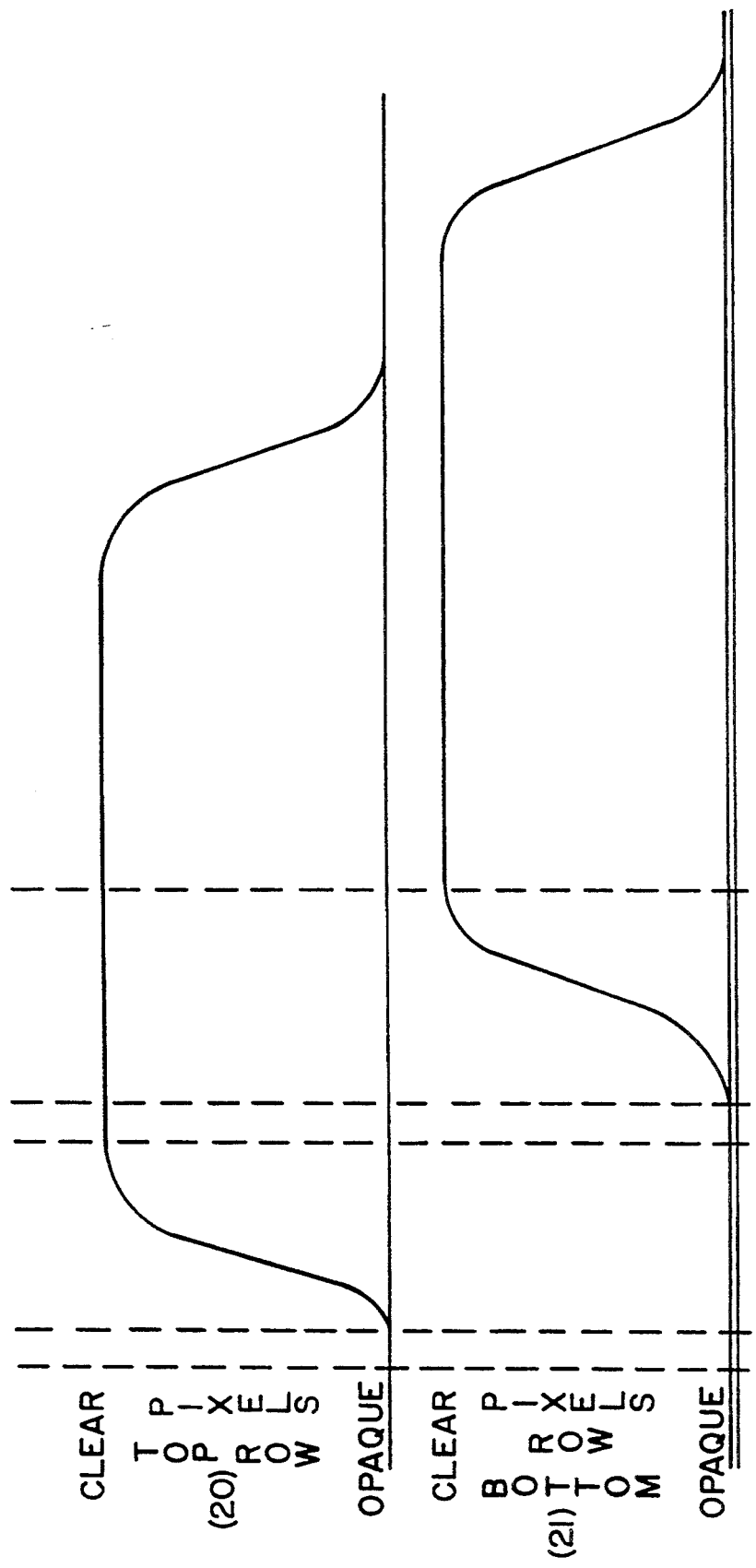

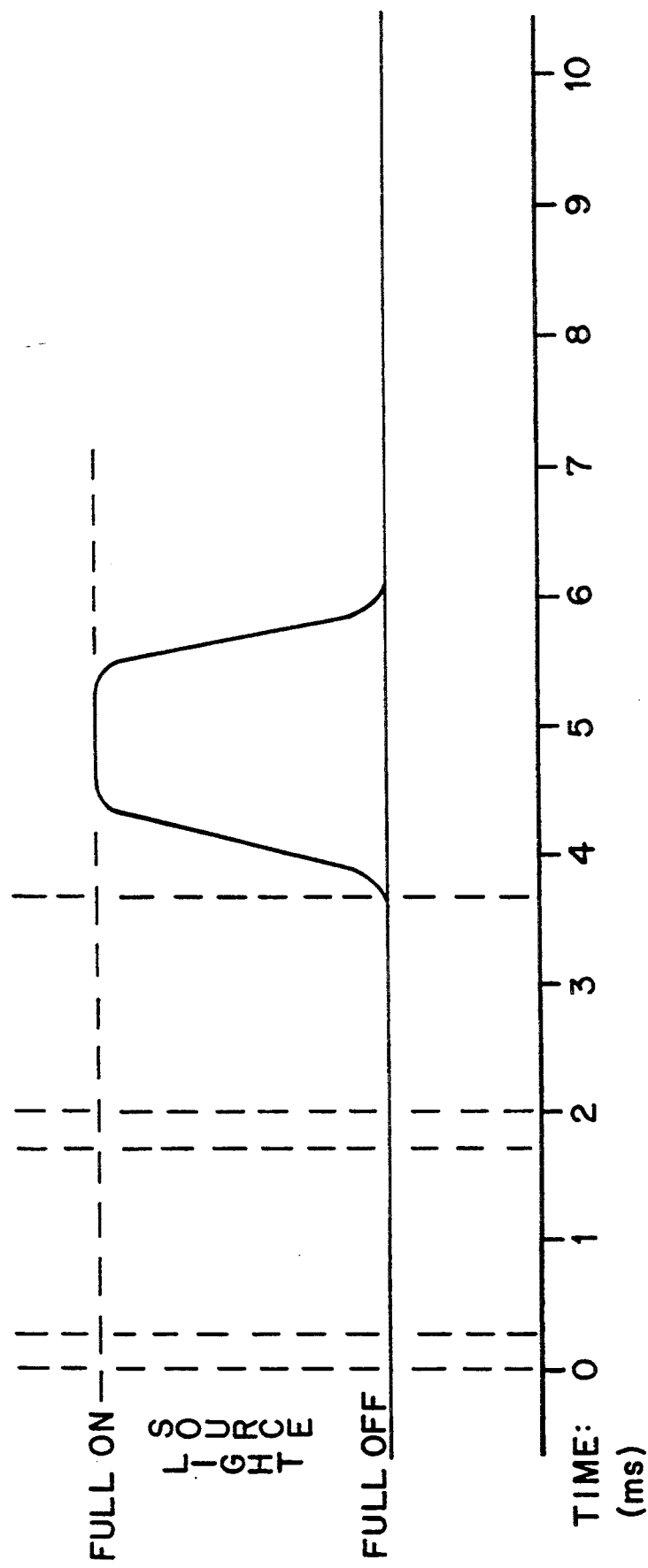

FIELD SEQUENTIAL COLOR ILLUMINATION SYSTEM FOR LIQUID CRYSTAL DISPLAY

RELATED APPLICATIONS

This application is a continuation in part of application Ser. No. 07/942,718, now patented, U.S. Pat. No. 5,410,345 filed Sep. 9, 1992.

BACKGROUND

1. Field of the Invention

The present Invention relates to a color liquid crystal display (LCD) system, and more particularly to illumination for liquid crystal display devices and field sequential color illumination for such devices in which said devices are illuminated by flashes of red, green, and blue light in sequence.

2. Prior Art

LCD technology has progressed rapidly in recent years. Most of the development effort has been directed toward TFT (thin film transistor) LCDs which have a transistor at each pixel. This allows one to regulate the amount of charge placed at the tiny capacitors located at each pixel, and thus precisely control the degree to which it turns on and off, in order to provide a gray scale. Such LCDs have very high contrast ratios, on the order of 100:1. The largest commercially available LCDs of this (or at the moment, any) type are about 15 inch (38 cm) on the diagonal. The highest resolutions available are about 640×480 pixels. The total numbers of colors that such LCDs can generate are in excess of 16 million with a suitable controller.

Although image quality of these LCDs is quite good in terms of contrast and color, their resolution and screen size make them suitable only for personal computer (PC) level applications. The industry is addressing both issues. The goal is the mass production of flat-panel LCD displays with at least the same quality as high-end cathode ray tube (CRT) displays.

Screen size is at present limited by the equipment required to manufacture the LCDs. The industry as a whole is introducing new systems that will allow the production of 14 inch (35 cm) and larger TFT LCDs. Sanyo, for example, produces a 16 inch (40 cm) diagonal black and white LCD. In the United States, UCE Inc. claims the ability to fabricate 1.4 meter diagonal passive STN LCDs, and is seeking to construct an advanced driving system to address and create images on such large LCDs.

Major difficulties remain with the reliable manufacturing of high resolution, high quality TFT LCD plates with up to several million pixels, however. Various technologies are being developed to cope with the production problem. One solution has been to develop alternate technologies which can reduce the electronic complexity of the LCD. For example, the Sarnoff Research Institute recently demonstrated an LCD in which the pixel scanning electronics are integrated onto the glass plate along with the pixel transistors.

A subclass of this approach has been the development of field sequential color techniques that allow each pixel to do the work of three. This could avoid some of the difficulties associated with the manufacture of high resolution LCDs by using fewer pixels. When using a field sequential illumination scheme, a very fast black and white LCD is operated at 180 frames per second. Red, green, and blue lamps (such as strobe fluorescent lamps) are flashed sequentially behind the LCD. Before each color is flashed, the LCD is addressed and made to display the red, green, or blue component of the image, yielding one complete color image every 1/60th second. Since the eye cannot detect image changes at this speed, the observer perceives a nearly flickerless full-color image.

The generation of color images through field sequential color illumination, along with apparatus used to perform this function, is described in several patents, including US-A-4,843,381 (OIS), US-A-4,786,146 (Hughes Aircraft), US-A-5,036,385 (Eichenlaub) and US-A-5,040,878 (Eichenlaub).

The Sarnoff Research Institute and several other companies are actively developing direct view and projection displays based on this method. Since it is relatively easy to create an LCD with many times the normal operating speeds of 60 frames per second (fps), this technique holds great promise. If this technology were combined with present state-of-the-art mass production techniques, color LCDs with resolutions in excess of 3,000,000 pixels could be manufactured.

US-A-5,036,385 describes a method whereby the resolution of a fast liquid crystal display can be increased beyond the total number of pixels on the display by sequentially focusing strobed light into sub regions of each pixel, while the LCD changes the state of the pixels to create intensity levels appropriate to the subregion locations on a high resolution image composed of the subregions, instead of the pixels themselves. Furthermore, the light focused into each subregion can be of different colors, and red, green, and blue light can be sequentially and repeatedly focused into different subregions to create color images composed of red, green, and blue color components.

Previous field sequential color devices have been unusable for many applications because of a phenomena called image breakup. If the user rapidly shifts his or her gaze, or is using a display in an environment where vibrations occur, such as in an aircraft, the red, green, and blue image components tend to be focused on different areas of the retina, resulting in an image that becomes broken up into rapidly shifting red, green, and blue components, particularly around edges. This can make the information on the display unrecognizable. As a result of this phenomena, field sequential color illumination systems have not been accepted in many potential applications areas.

Thus, a need exists for a field sequential color illumination device that will allow full color display without color filters and excessive numbers of pixels, and also will not produce significant image breakup phenomena.

SUMMARY OF THE INVENTION

In an electronic display utilizing an array of light valves, whose transparency can be individually controlled to form images, the improvement being a stroboscopic illumination system for the display comprising a plurality of light sources consisting of at least two sets of light sources, each set of light sources emitting light of a different color and the plurality of light sources also consisting of at least two groups, each group containing at least one member of each set; an electronic means for independently controlling the on and off states of the light sources in synchronization with the process of image generation on the electronically controllable light valve array, such that different groups of light sources are turned on, then off, in succession; an optical means for accepting the light emanating from the light sources and to focus the light into patterns of lines, line segments, or point like areas within or near the plane of the light valve array, the light patterns illuminating selected sub regions of the elements of the light valve array; the light sources, optics and on/off sequence are so arranged that when any group of light sources is on, light of at least two colors emanating from members of different sets within that group is directed into subregions of different sets of light valves at the same time, so that light of different colors are being directed into different sets of light valves.

DESCRIPTION OF THE PREFERRED EMBODIMENT

The method and apparatus of the present invention is based on a method of increasing the resolution of a liquid crystal display as described in US-A-5,036,385 and details of the configuration and operation of illumination systems used to achieve this effect are described in a co-pending application. The overall technique involves the use of a changing pattern of light emitting regions which sequentially illuminate subsections of each pixel. For illustration of general operating principles, the operation of a monochrome system will be described with reference to FIGS. 1-5.

Figure 1:
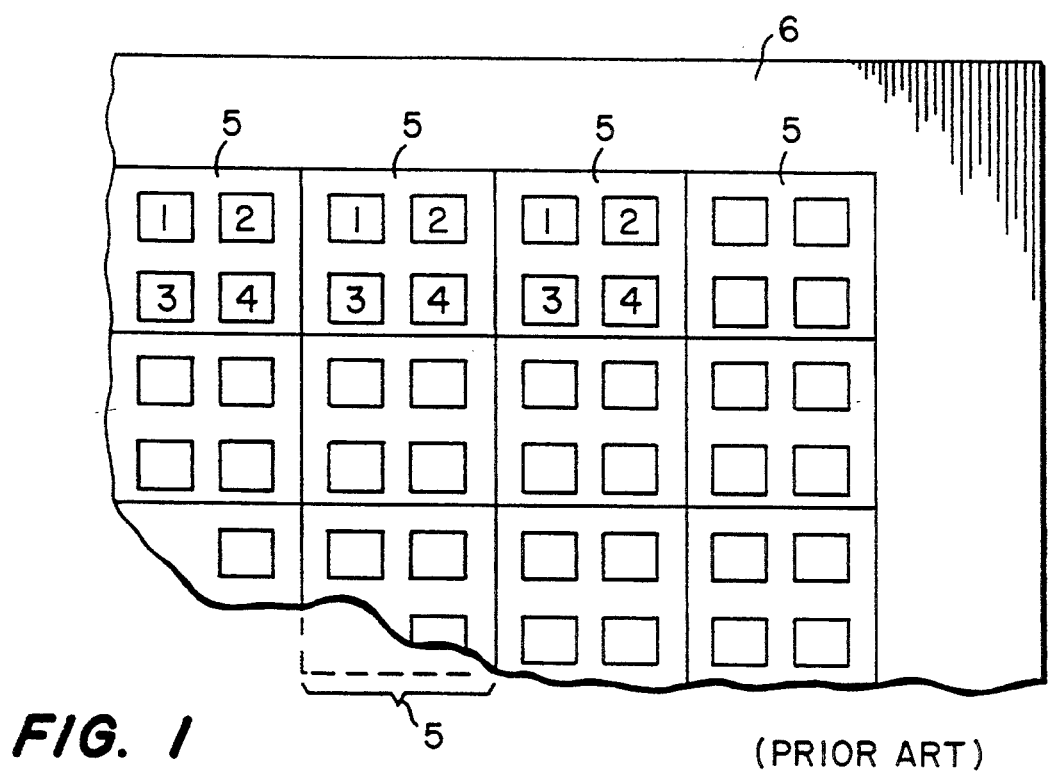
FIG. 1 is a magnified view of a section of an LCD, showing how different subregions of each pixel of the LCD can be illuminated in a certain temporal sequence.

In FIG. 1 four light emitting regions 1-4 are situated either near the liquid crystal (LC) layer of the display, or ideally are projected onto the plane of the LC layer by appropriate optics (an example of which will be described later). Light emitting regions 1-4 turn on and off in succession, so that first light 1 is turned on, then the first light 1 region turns off and the second light emitting region 2 turns on, and so on with the third and fourth light regions 3 and 4. When the first light region 1 is on, the transparency of each pixel 5 on the LCD is changed to provide the correct apparent brightness for each of the illuminating regions so that an observer sees an image composed of region 1. When the second light emitting region 2 is on, each pixel 5 again changes its transparency so that the observer sees different parts of the same image made up of region 2, and so on with the remaining light emitting regions 3 and 4. Thus, during each cycle, through each light emitting regions 1-4 a complete 2N×2N image is built up from the interaction of the N×N pixel LCD and the pattern of illuminating regions 1-4.

The increase in resolution that can be obtained using this method depends on the speed of the LCD. With proper sequencing of the illuminating regions, an LCD operating at N×30 frames per second can form almost flickerless images that have a total resolution N times greater than the LCD itself. Although the light emitting regions shown in FIG. 1 are squares arranged in a grid pattern, any shape and arrangement could in principle be used.

Figure 2:
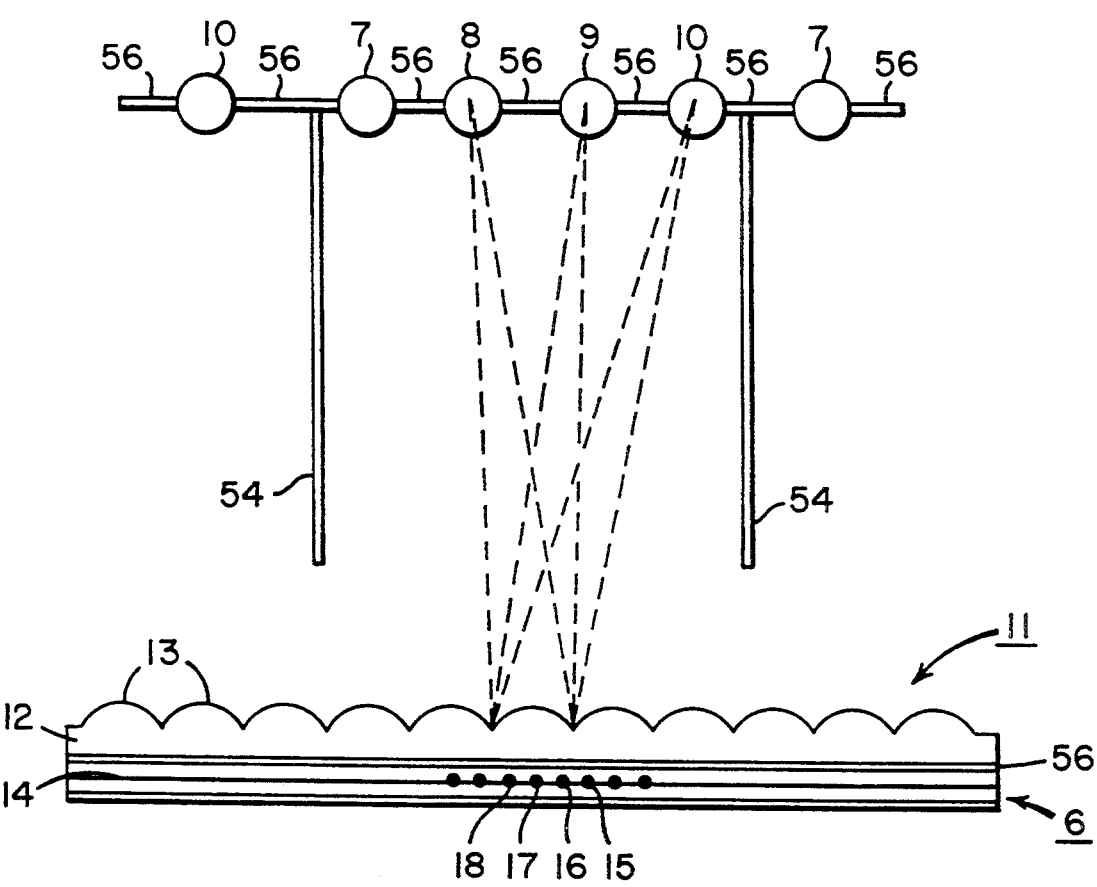
FIG. 2 is an illumination system involving lamps and fly's eye lenses, that can be used to direct light into the pixel subregions shown in FIG. 1 in a certain temporal sequence.

The method that is typically used to create light emitting points or lines within or behind each pixel is illustrated in FIG. 2. In FIG. 2, point-like light emitting sources 7, 8, 9 and 10 are placed behind a fly's eye lens sheet 11 consisting of a clear base such as a sheet of glass or plastic 12 with fly's eye spherical lenses 13 molded into one surface. The lenses 13 can be conventional refractive lenses or high quality diffracting or binary lenses. The lenses 13 are arranged in an array with straight rows and columns. The curvature of each lenslet is such that it forms images of the light emitting sources 15-18 near or at the layer of liquid crystal material 14 within an LCD 6 mounted directly in front of the lens sheet 11.

The size and arrangement of the fly's eye lenslets is such that one lenslet is situated behind each pixel of the LCD, and thus forms images 15-18 of the four light emitters 7-10 within or slightly in front of or behind each pixel, as is shown in FIG. 2. It is also possible to focus the images of the light emitters 7-10 on to a diffuser placed on the side of the LCD 6 opposite the light emitters 7-10 in order to achieve even illumination. It is also possible to place a weak diffuser between the light emitters 7-10 and the LCD 6 to achieve the same purpose.

Although a small number of light emitting points or lamps 7-10 is shown in FIG. 2 for simplicity, there being one lamp for each set of light sources, in most embodiments an array of many light sources would be used. One advantage of a larger array consists of an ability to place the array closer to the LCD than a small number of lamps, since each light source can be used to illuminate just a small section of the LCD. This, of course, saves space. Another advantage lies in the ability to relax the address and pixel change speed requirements for the LCD compared to a system with few light sources. The reasons for the second advantage will become apparent from the discussion below.

An opaque flat black non-reflective barrier 56 blocks the area between and to the sides of light emitters 7–10, so as not to allow light to exit the sides of light emitters 7–10 or to be reflected from the light emitters 7–10 from points other than the light emitters 7–10. A system of baffles 54 consisting of opaque dividers or barriers extending out from the barrier 56 can be placed in the system as shown in FIG. 2 to prevent light from the light emitters 7–10 reaching points on the lens 12 far from the area directly in front of the light emitters 7–10.

It is generally desirable that the lens 12 have anti-reflective coatings 55 on their front most and rear most surfaces, that any non diffusing surface of a diffuser has an anti-reflective coating 55, and that the rear most surface of the LCD 6 have an anti-reflective coating 55.

Figure 3A:
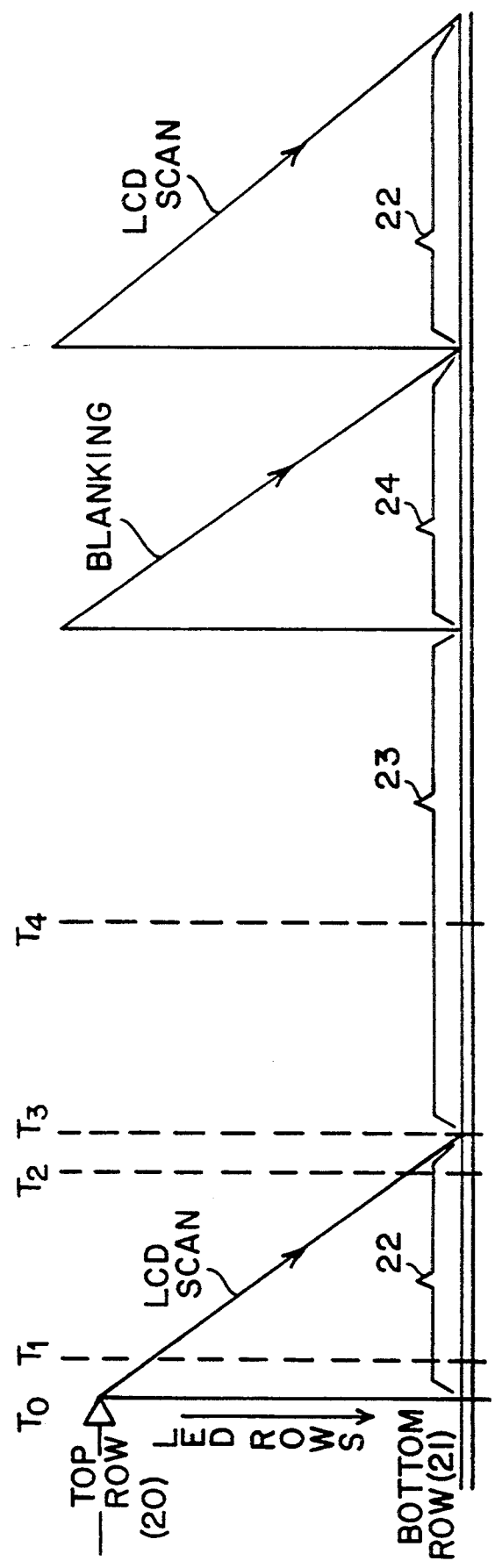
FIG. 3 is a timing diagram illustrating the timing involved between the address of pixels on the LCD, the generation of images due to changes in pixel states after address, and flashing of the various lamps in FIG. 2.

The timing sequence of LCD scan (during which all pixels are addressed), pixel transmittance changes to form the next image component, and light source turn on and turn off when a small number of lamps is used, as in FIG. 2, is shown in FIG. 3.

The timing diagram of FIG. 3 is composed of graphs 3a, 3b, and 3c. Graph 3a depicts the repeated address of LCD rows starting at the top row and proceeding to the bottom row. Graph 3b shows the change from "off" or opaque state to "on" or clear state (or vice versa) of the first and the last pixels in a video field, after these pixels have been addressed, and the flashing of the first light emitting point or lamp 7 shown in FIG. 2. In the case of TFT and Ferroelectric LCDs, when a pixel is turned on during the scan of an LCD, it stays on until turned off, in this case until the scan of the entire LCD to display one video frame is completed, and the last pixels have had time to change their state.

As shown in graph 3a the time period between the start of one LCD scan and the start of the next is divided into three periods during which three actions occur: a first period 22 during which the LCD is scanned and its rows sequentially addressed usually starting at the top row 20 and ending at the bottom row 21 causing the pixels to change state in order to display the next image, a pause or waiting period 23 during which nothing happens, and an optional blanking period 24 of beneficial effect in some LCDs in which the LCD is scanned again and all the pixels are addressed and made to change state to either full on or full off. Typically, all the pixels of a given row are addressed at the same time.

The signal to change the states of the first row pixels is given to the LCD 6 at time $t_0$. For illustrative purposes, it is assumed that a delay of about 2 ms occurs before the pixel completes its change to a new state in response to the applied signal—it begins to turn on at time $t_1$ and completes the change in its state between opaque and clear at time $t_2$ as shown in graph 3b. Although in graph 3b pixels are shown turning between full off and full on it is understood that typically some will be turning from on to off and others will turning between one intermediate gray state and another. The last pixel starts its state change at time $t_3$ when it is addressed and completes it at time $t_4$. At this instant the video frame is complete and the light source 7 flashes, as shown in graph 3c, thus transferring the information in the first field to the observer. As seen in graph 3a a pause period 23 during which no addressing of the LCD happens is inserted in order to give all the pixels time to change to their new state before the lamp is fired. If the time it takes a pixel to change state is long enough, or the time required for a scan is short enough, a second scan can occur during the pause period. During the second scan the same image information is transferred to the LCD as in the first scan. The optional blanking scan can then occur followed by the next address of the LCD during which the pixels are addressed in order to create the second image field. The sequence in the second frame is the same as in the first frame except that lamp 8 flashes. Likewise, the timing of events is identical in subsequent frames, the only difference being the information written to the LCD and which of the lamps flashes.

This scanning, changing, and flash sequence proceeds continuously, as subsequent high resolution image frames, each consisting of four sequential fields made visible to the observer by means of lamp flashes, are displayed.

In the case of the system providing four times resolution increase illustrated in FIGS. 1–3, a total of 8.3 ms at most must elapse from the time the address signal has been applied to the first pixel to the completion of the change in state of the last pixel, the flash of the lamp, and the beginning of the next address of the first pixel. This allows 120 fields to be displayed per second or 30 complete, high resolution images displayed per second. A lesser number of images displayed per second would result in flicker being apparent, as has been confirmed experimentally with a system that increases the resolution of a ferroelectric LCD by a factor of four.

Again as shown in FIG. 3, the pixels take a certain period of time to change state once they are addressed. In this case 2 ms is shown for illustration, that being the period typical of a custom pixel LCD being made by an LCD development lab for Dimension Technologies Inc. The time required to turn off from full on may be different than the time required for full on to full off, or the time required to change between various intermediate gray levels. In such cases, the longest time period required to change between two states is most relevant, and must be accommodated so that all pixels, regardless of which states the change to or from, can complete their change before a lamp is fired.

Lamps, of course, never flash instantaneously, but rather emit light for a short time and then turn off. The duration that the lamp is emitting light depends on the lamp, and can be controlled with some lamps, such as LEDs. In general, the lamp should emit light only during the time period between the completion of the last pixel's change and the beginning of the next address scan. However, if a blanking scan is used, and the LCD is blanked to a dark state, the lamps may emit light during the blanking period without significant image degradation. However, if the LCD is blanked to the bright or transparent state, the lamps should stop emitting light before the blanking period begins. Otherwise, contrast will be lessened considerably.

Figure 4:
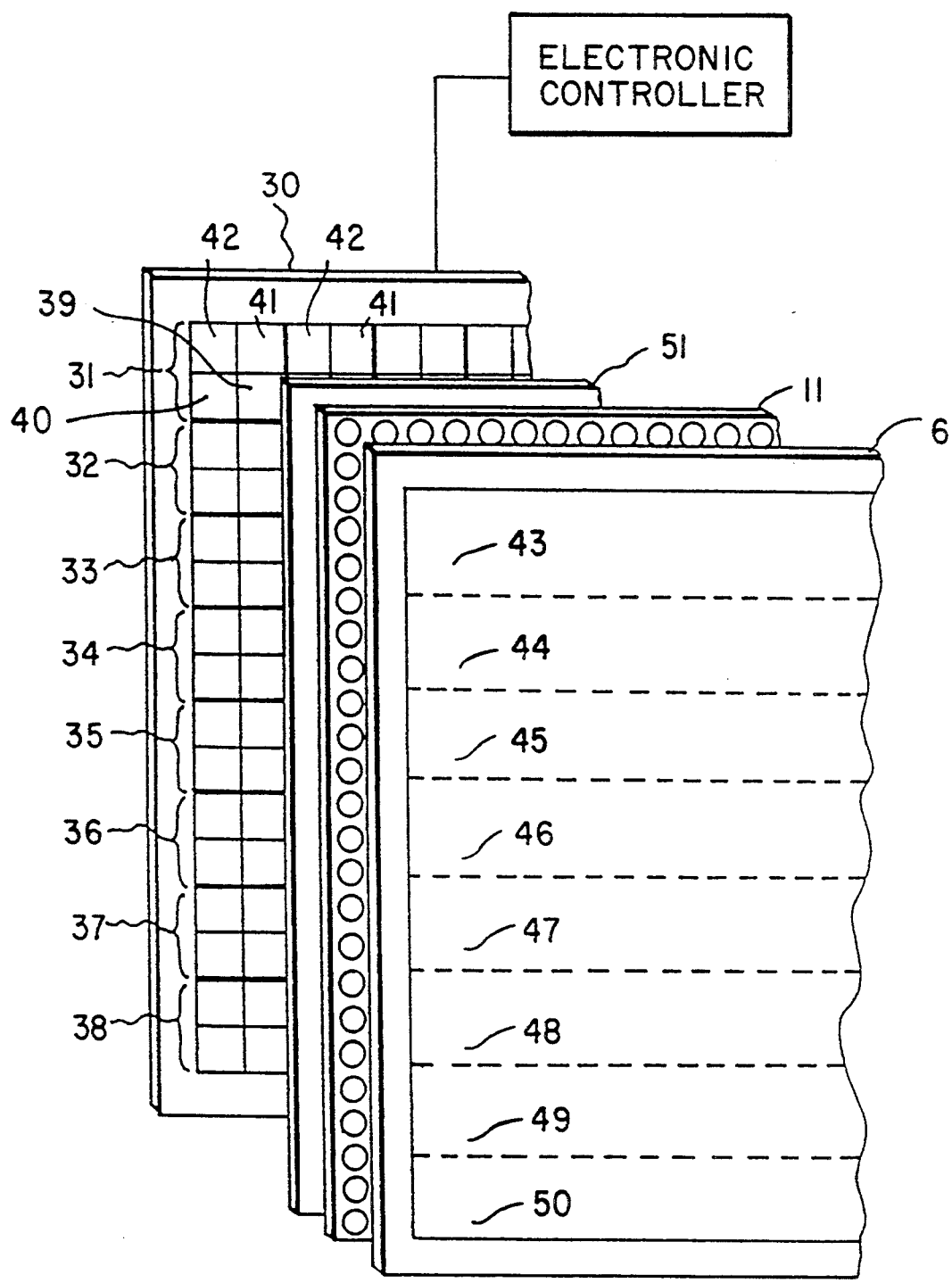
FIG. 4 diagrams an alternate illumination configuration using a large number of lamps and a suitable fly's eye lens to achieve the same effect as the illumination system in FIG. 2, but which occupies a smaller volume.

FIG. 4 shows a configuration using an array 30 of a large number of light sources placed at a shorter distance behind the fly's eye lens sheet 11 and LCD 6. FIG. 5 is a timing diagram showing how lamps in different rows of the array are turned on and off in synchronization with LCD scans and pixel changes.

The array shown in FIG. 4 has 8 rows of light source groups 31–38. Each group consists of four light sources 39–42. Each row of light source groups illuminates a horizontal section of the LCD 43–50 of roughly ⅛th the LCD's height. The LCD is assumed to be addressed row by row, starting from the top, as is typical of LCDs. Since each light source only illuminates a ⅛th horizontal section of the LCD, one must wait only for the pixels in a given ⅛th section to be addressed and complete their change before turning on the lamps behind it.

Figure 5A:
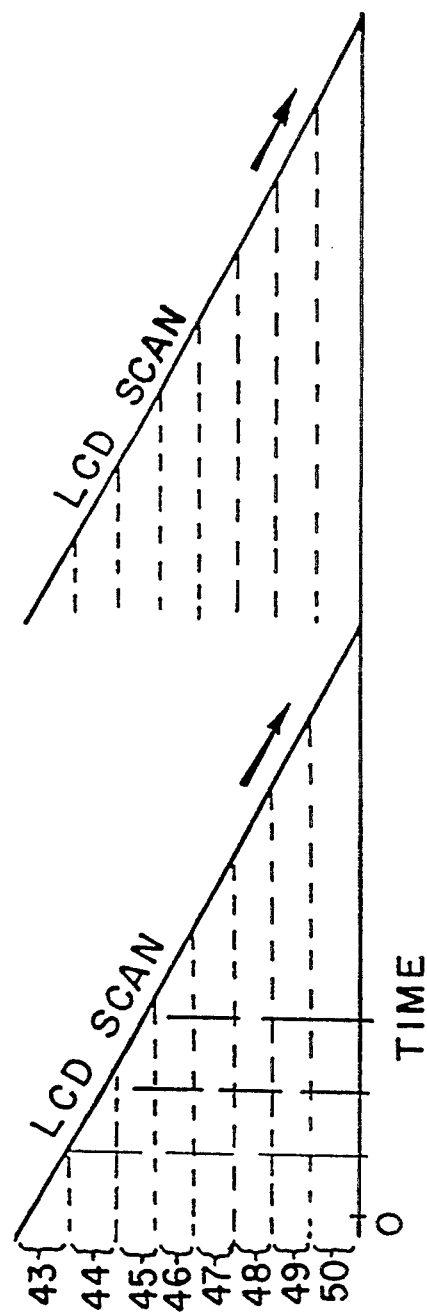
FIG. 5 diagrams the timing involved between the address of the LCD, changes in pixel states after address, and flashing of the various lamps shown in FIG. 4.
Figure 5B:
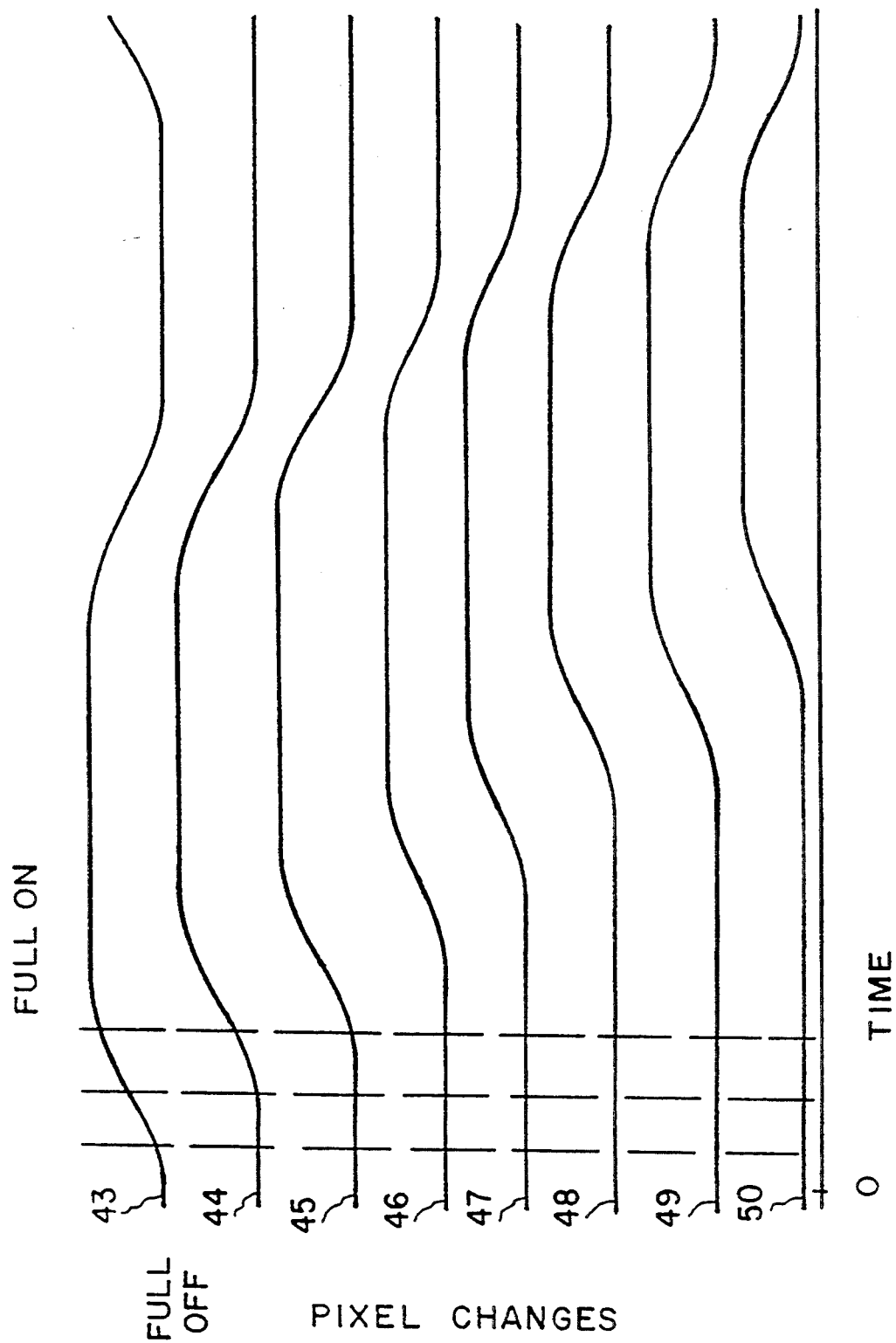
Figure 5C:
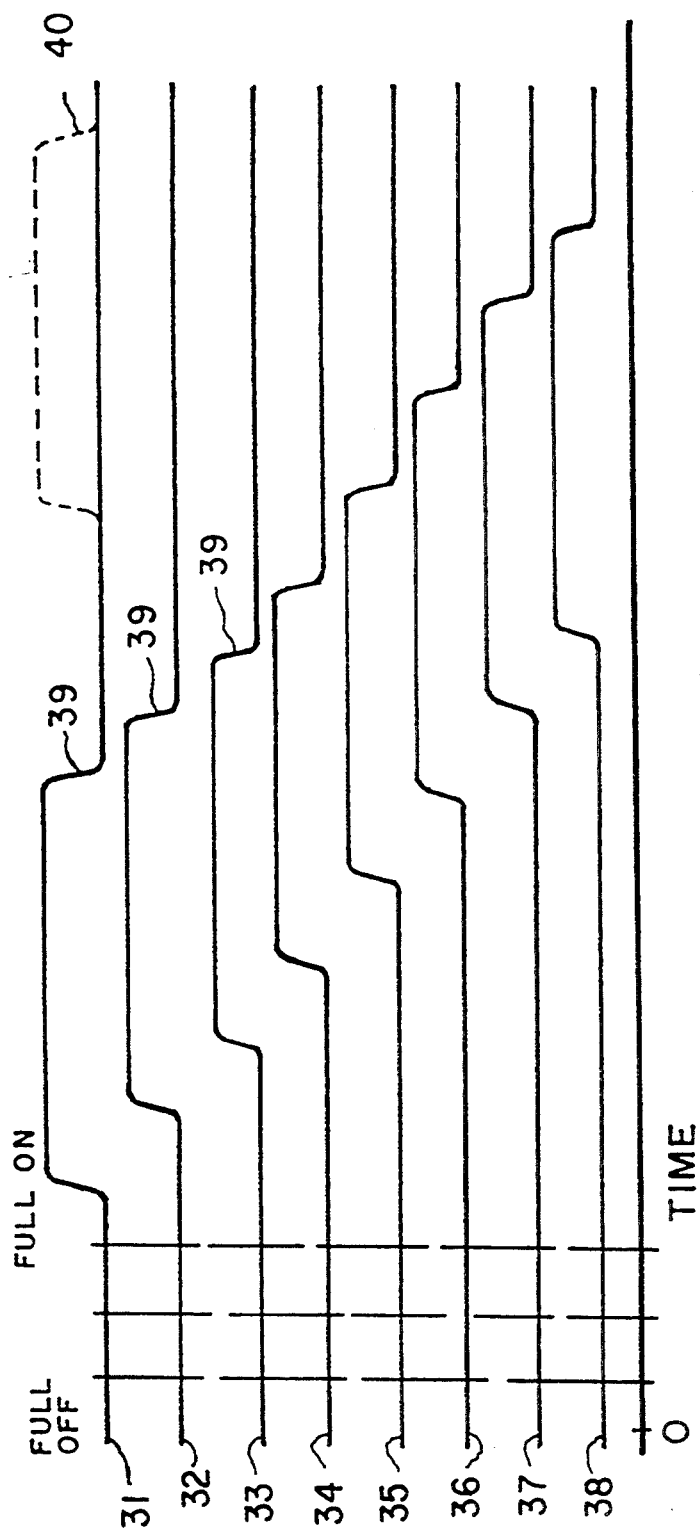

For example, in FIG. 5 the address and pixel response of the last rows of sections 43–50 are shown in FIGS. 5a and 5b. Again, the LCD is operated at 120 times per second, and the pixels take 3.5 ms to respond. As soon as the pixels of the last row of section one are through changing, the lamps marked 39 in the row of lamp groups 31 in FIG. 4 are turned on. Their brightness curve 31 is shown in graph 5c. They may remain on until the first rows of section 43 are addressed again, and start changing. Graph 5c shows the lamps turning off at this point in time. The light from these lamps is imaged by the fly's eye lens into the upper left quadrants of each pixel. Likewise, as soon as the pixels of section 44 are through changing, the lamps 39 of row 32 are turned on. These, likewise do not turn off until the first row of section 44 is addressed again. The address and turn on sequence continues for section 45–50.

After the last section 50 is addressed, the scan can immediately proceed to address the LCD again, starting at the top. The lamps behind section 43, of course, will ideally turn off before the next scan of section 43 begins. After the first section 43 is addressed again, and its pixels have had a chance to change, lamps 40 in row 31 are turned on, providing illumination to the upper right hand quadrants of the LCD pixels of section 43. The remaining lamps 40 of rows 32–38 turn on in succession, as the pixels of the sections 44–50 in front of them complete their change to a new transparency state.

Likewise, on the next scan in the sequence, lamps 41 flash on and off, and then on the next scan after that the lamps 42 flash on and off. Thus, within four scans, a complete high resolution image is presented to the observer. During the next four scans, the next frame of the high resolution image is created in the same way using the same scan and lamp flash timing sequence shown in FIG. 5.

The main advantage of this embodiment of this invention is that the time required for the wait frame or pause period, where one is waiting for all the pixels, including the very last ones, to complete their change is greatly shortened. Each of the smaller sections is illuminated as soon as the pixels within that section complete their change, which may occur while another part of the LCD is still being addressed. Indeed, if the pixels can complete their change in a period of time less than the interval between the address of the last column of their section and the next address of the first column of their section, as is the case in the timing diagram of FIG. 5, the LCD can be addressed continuously, without any pause at all between fields.

Also, given the arrangement of FIG. 5, the lamps do not necessarily have to flash in a very short interval. They can remain on for the duration of the period between the time when the pixels of the last addressed column of the section in front of them complete their change to the time when the pixels in the first addressed column are addressed again during the next scan. In the case of ferroelectric LCDs, with pixel response times of much less than 1 ms, a given lamp may remain on for the most of the time between subsequent scans of the section in front of it. This can result in a brighter display, since each lamp remains on for a greater fraction of the total time.

Although FIG. 4 shows four sets of light sources arranged in groups of four lamps each, it is understood that any number of light sources or groups of light sources, constrained in their number only by the physical dimensions of the display, the dimensions of the light sources themselves, and the address and pixel response speed of the LCD, could be used in this illumination scheme.

If an array of more than one set of light sources is used, it will usually be necessary to diffuse the light coming from it in order to create even illumination. This can be accomplished by the use of a weak diffuser 51 as shown in FIG. 4 situated between the array and the lenticular or fly's eye lens. A weak diffuser placed on or near the front of the LCD will also work. An alternative lens configuration can be used to focus light beyond the pixel layer onto a diffuser located in front of the LCD.

Of course, if the light sources in FIG. 4 are of different colors, particularly if they are red, green, and blue, then a color image can be built up by sequentially flashing the red, green, and blue sources either all together or following the scan of the LCD as explained above. For example, in FIG. 4 lamps 39 might be red, lamps 40 and 41 green, and lamps 42 blue. In that case, light regions 1 would be red, regions 2 and 3 would be green, and regions 4 would be blue—resulting in a quad arrangement of colored subregions similar to that used on some existing LCDs that employ colored filters over each pixel. The same timing sequences described above would apply. However, note that with that particular color arrangement, both green lamps could turn at the same time.

Such a flashing sequence, will, however, lead to the same type of image breakup phenomena seen in other field sequential color displays. It is also believed this would necessitate a much faster address speed and pixel response speeds for the LCD, as is the case with existing field sequential color systems. This is because in order to avoid flicker one would undoubtedly have to create a compete image every 1/60th as opposed to 1/30th second, as is the case with other field sequential color systems that illuminate the whole LCD first with red, then green, then blue light. That means that the LCD must be capable of generating 180 completely different images every second, so that, a red, a green, and a blue image component are presented every 1/60th second.

The illumination sequence used to overcome the image breakup phenomena relies on the ability of this invention's field sequential color illumination system to multiplex the illumination spatially as well as temporally. This ability should also allow one to operate the LCD and illumination system at much lower speeds—possibly as low as 30 complete images per second—without flicker becoming visible. The reason for this is that a line interlaced image can be created in which members of a set of three lines of red, green, and blue image elements is flashed sequentially.

Long ago, researchers discovered that cathode ray tubes (CRT) could be operated at 30 frames per second, instead of 60, without objectionable flicker, if an interlaced scanning system were used. In this scheme, which is used in ordinary home television sets, every other row is scanned in 1/60th second, and the remaining rows are scanned during the next 1/60th second. A complete image is built up in 1/30th second. This system allows flicker-free imaging at lower speeds because, although it takes 1/30th second for a full image to be built up, the eye still sees the screen filled with light during each 1/60th second interval. During successive intervals, the scan lines are shifting by a barely detectable amount.

This invention's system can achieve an interlace effect with field sequential color illumination. The system does this by focusing the red, green, and blue light into sequentially illuminated spots or lines within the pixel boundaries. These lines, or rows of color spots, can be spatially and temporally interlaced in a manner similar to the scan lines of a CRT. The main difference is that to achieve the same resolution possible with other field sequential color systems, the interlace must be 3:1 instead of 2:1.

Figure 6:
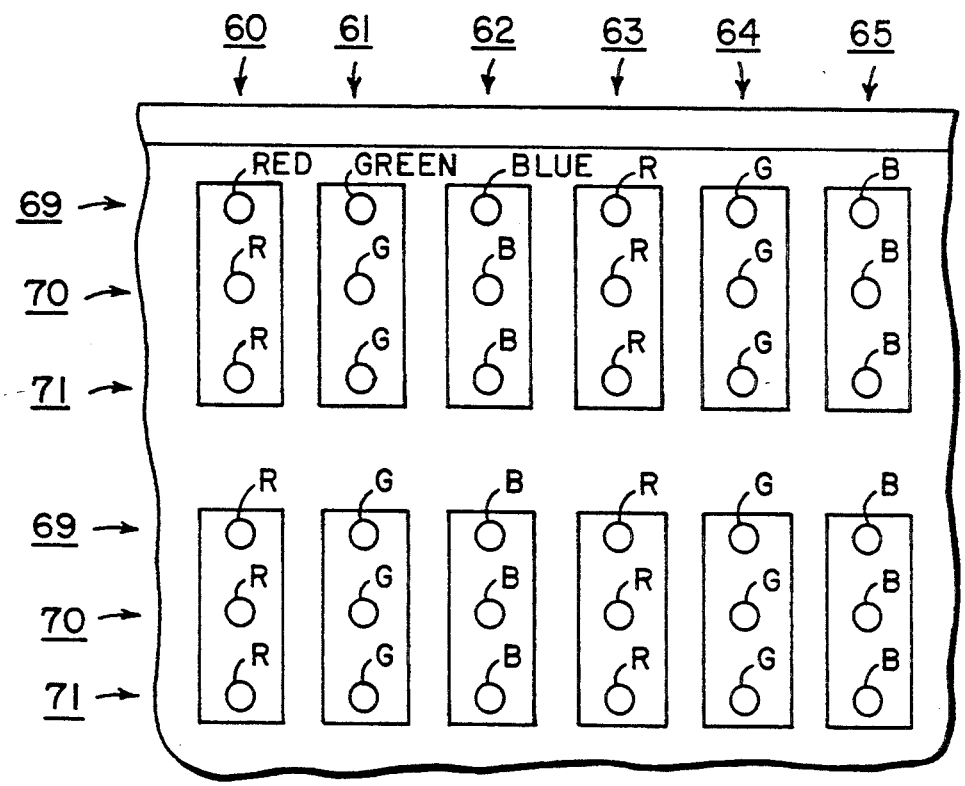
FIG. 6 is a magnified view of a section of an LCD illustrating how subregions of pixels can be illuminated by red, green, and blue light in a certain spatial pattern and in a certain temporal sequence.

FIG. 6 shows one of several interlace configurations that can be generated with this type of optics. This particular pattern is closest to the typical CRT row interlace scheme and therefore good for illustrative purposes. The figure shows a magnified view of two representative row of pixels on an LCD. During the first /90th second, the LCD is scanned and the pixels in columns 60, 63, 66, etc., are made to change their transparency to display part of the red component of an image. Pixels in columns 61, 64, 67, etc., are made to change their transparency to display part of the green component of an image, and pixels in columns 62, 65, 68, etc., are changed to display parts of the blue component of an image.

At the end of the 1/90th second period, when the pixels have had a chance to change, strobed illumination is focused into individual red, green, and blue light spots within the top third of each pixel 69.

During the second 1/90th second time period, the pixels of columns 60, 63, 66, etc., are changed to display another row of the red component of an image, the pixels of columns 61, 64, 67, etc., are changed to display the next row of the green component of the image, and columns 62, 65, 68, etc., are changed to display another row of the blue component of the image. At the end of this second 1/90th second interval, light is focused into a second row of spots 70 in the middle of each pixel.

During the last 1/90th second interval, the pixels once again change to display the remainder of the image, and strobed light would be focused into a new rows of spots 71 in the bottom third of each pixel.

Note that in this case each group of three red, green, and blue spots in each row is being used as a complete image pixel, in a manner similar to a typical color LCD with color filter stripes.

Also note that the visual effect here would be similar to that seen on an interlaced CRT, except that instead of two sets of interlaced horizontal rows appearing sequentially, three rows would be used. With regard to flicker it is believed the results will not be significantly different from what is seen on a normal interlaced CRT with low persistence phosphors.

In this example, if the LCD had a pixel resolution of M (horizontal) by N (vertical), the resolution of the image would be M/3×3N—the total number of pixels would be the same in image and LCD, but the ratio of horizontal to vertical resolution would be different. It would be best in such a case to start out with pixels that had a high ratio (as shown) between their vertical and horizontal dimensions.

Figure 8:
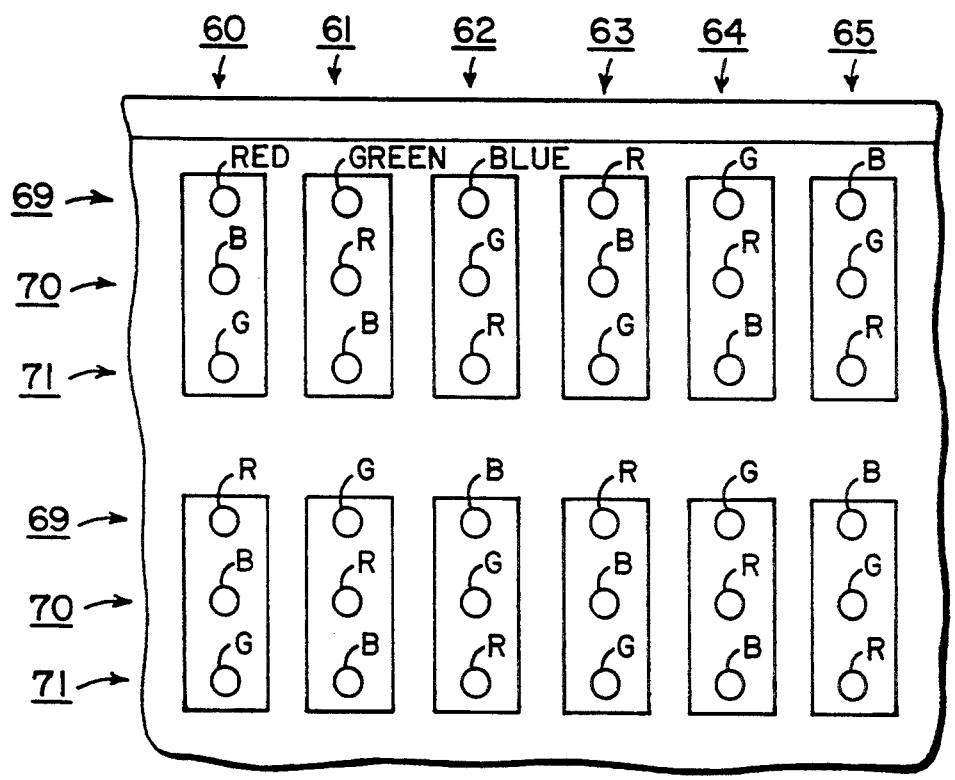
FIG. 8 is a magnified view of an LCD showing an alternate spatial pattern of colored illuminated subregions that can be illuminated in a certain temporal sequence.

Another option, achieved using an illumination pattern similar to that shown in FIG. 8 allows each pixel to be illuminated by red, green and blue light in succession and thus allows each pixel on the LCD to represent a pixel on the image. In such a case each pixel would represent one element of a M×N image, and would change its transmittance to reflect the intensity of red, green, and blue light at that point as the red, green, and blue light illuminated subregions of it.

It is not necessary for the red, green, and blue illuminating spots to be created in straight rows and columns. It is suspected that randomizing their placement to some degree would tend to improve performance with regard to image breakup even further. FIG. 8 shows such a randomized pattern and illuminating sequence. Rows 69, 70, and 71 are illuminated sequentially as described above, but note that the red, green, and blue areas are not in the same left right sequence in the three sets of rows.

Figure 7:
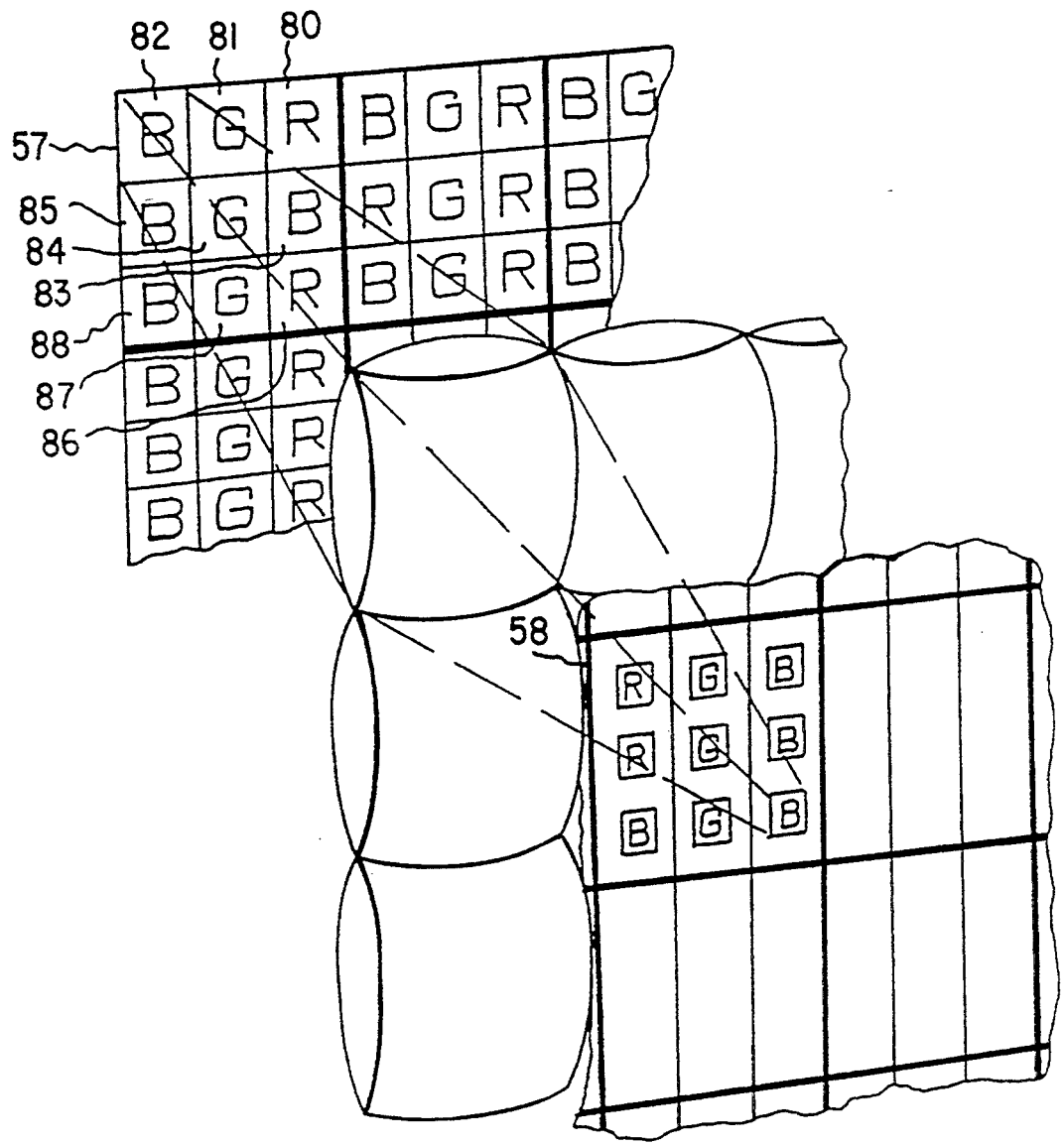
FIG. 7 diagrams an illumination system that can be used to create the spatial patterns and temporal sequence illustrated in FIG. 6.
Figure 9:
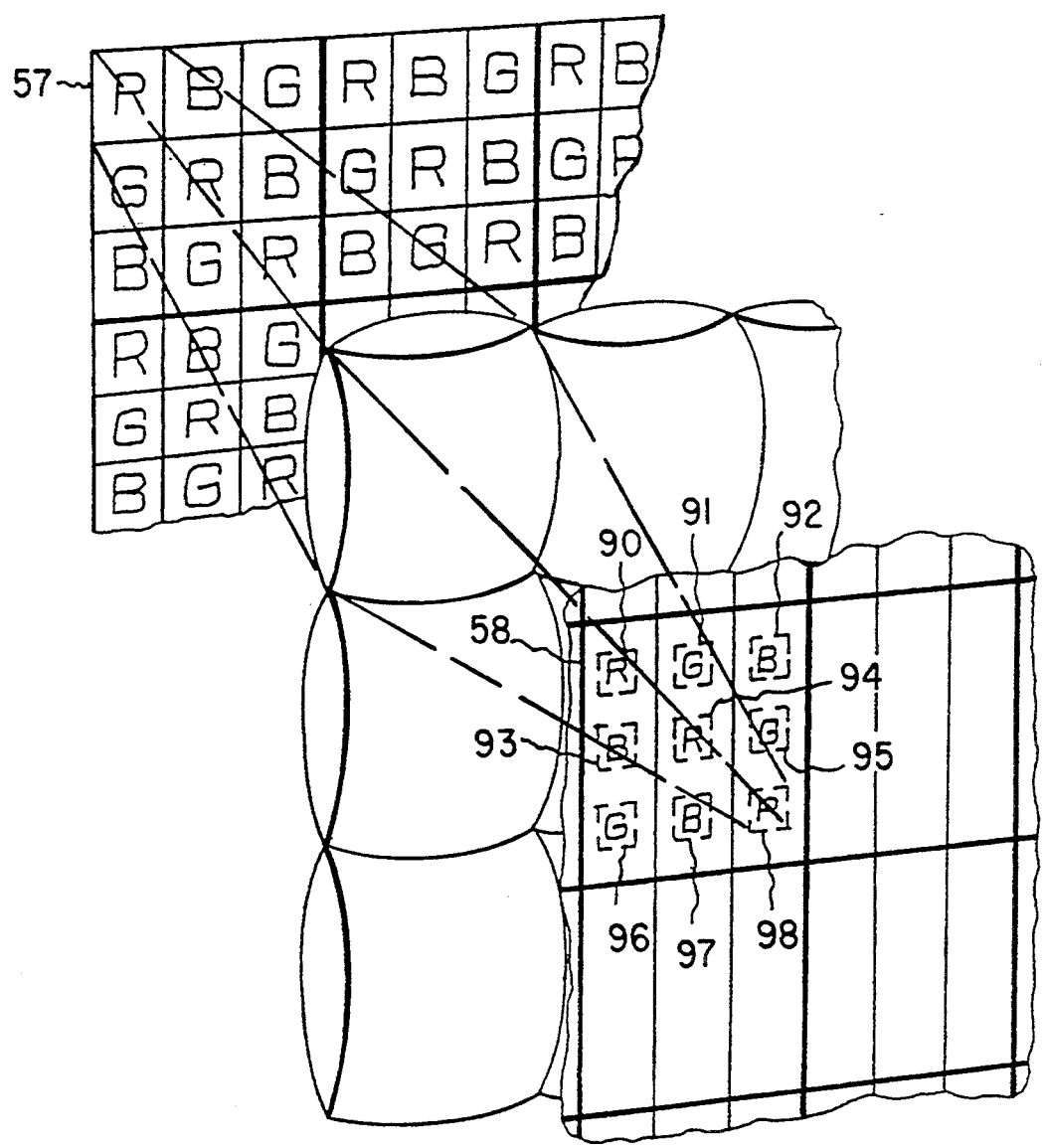
FIG. 9 is a drawing of part of an illumination system that can be used to create the spatial pattern and temporal illumination sequence shown in FIG. 8.

FIG. 7 shows the type of illumination array 57 and fly's eye lens 58 arrangement that could be used to generate the light patterns shown in FIG. 6. FIG. 9 shows the type of illumination array 57 and lens 58 that can be used to generate the light patterns shown in FIG. 8. A fly's eye lenslet is configured so that each lenslet is situated behind a group of pixels where the entire repeating pattern is to be focused. For example, if the pattern repeats in every group of three pixels, as in FIG. 7, lenslets of roughly the same size as a group of three pixels must be used, and placed behind every group of three.

Arrays of red, green, and blue lights on the illuminator would be arranged in the same repeating pattern, except that the pattern would be inverted, as shown, relative to the patterns focused into the pixels, because of the inversion created by the lenses. The illuminating regions on the array and the lenslets would have the proper spacing and dimensions so that the lenses created images of the illuminating regions in the correct sections of the correct pixels.

As before, the elements of each set on the illuminator could be made to turn on and off sequentially from top to bottom, following the scan of the LCD. If the illumination of FIG. 7 had 8 rows of 3×3 patterns, 8 sections of the LCD would be illuminated sequentially. In the figure, the lamps 80, 81, 82 would turn on during the first scan, to illuminate the bottom ⅓ of each pixel. Lamps 83, 84, 85 would turn on during the next scan to illuminate the middle third of each pixel, and lamps 86, 87, 88 would turn on to illuminate the top third of each pixel.

Note that it is not necessary to illuminate the pixels sequentially by rows. It is also theoretically possible to illuminate light spots in different rows in different pixels at the same time. For example, in FIG. 9, one could illuminate first the areas 90, 91, and 98 at the same time, then the areas 93, 94 and 92 and next the areas 96, 97, and 95. The only requirement is that during any given illumination period, red, green, and blue illumination is on, and during each three period cycle all the areas within all the pixels are illuminated.

Figure 10:
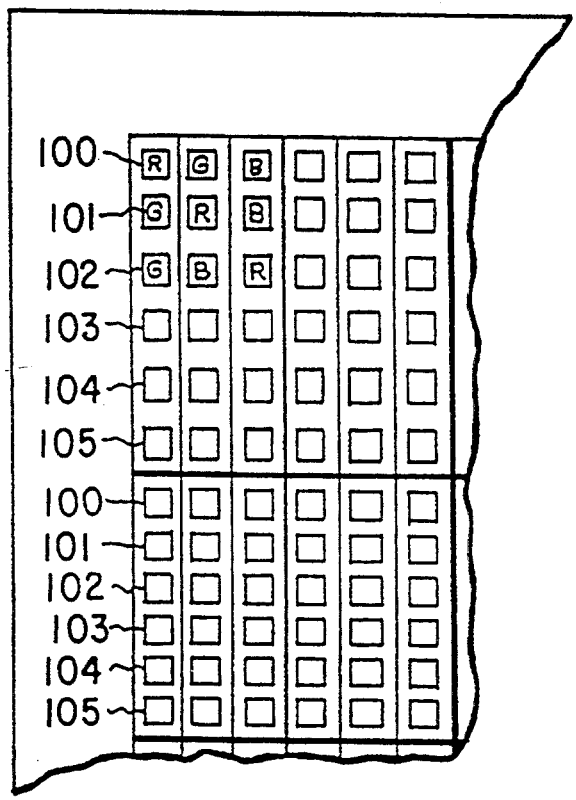
FIG. 10 is a magnified view of part of an LCD showing how a larger number of subregions in a certain spatial pattern can be illuminated within each pixel in a certain temporal sequence.

Although three rows of illuminated sub regions of each pixel are shown in FIGS. 6 and 8, that number can be greater than three. By using greater numbers of subregions, the color image created can posses a resolution greater than the pixel resolution of the LCD. FIG. 10 is a diagram showing six lines of subregions 100-105 within each pixel which are illuminated sequentially, starting rows 100 and proceeding through rows 105. Given an LCD with N×N resolution, this arrangement would produce a color image with N×2N resolution.

Of course, if more subregions are used, a faster LCD must be used to avoid flicker, since more image sub components must be illuminated sequentially during the 1/30th second period. It is suspected, also, that as the number of subregions in each pixel increases, the overall frame speed, the time in which an entire image is built up, must be shortened. At the extreme end, a very large number of sequentially illuminated sub regions within large pixels may require a frame speed of around 1/60th second, since the visual impact will start to approach that of a none interlaced CRT, which has to be operated at 60 fps to avoid flicker.

Figure 11:
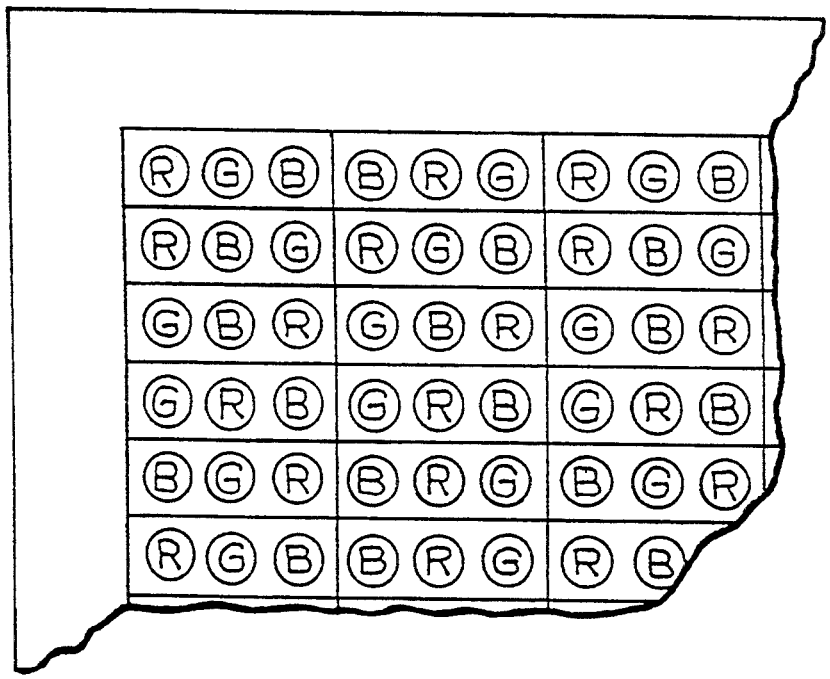
FIG. 11 is a magnified view of part of an LCD illustrating a larger spatial pattern of colored subregions within a larger number of pixels.

FIGS. 8 and 10 show 3×3 patterns of illuminated subregions of pixels. However, larger or smaller patterns can be used. FIG. 11, for example, shows a six by six pattern that can be repeated within groups of 6×6/3=6×2 pixels. One such group of pixels is encircled by the dotted line in FIG. 11.

In some situations, it may be desirable to use an illuminator consisting of a one dimensional array of linear light sources. The most common type of illumination used for LCDs, namely fluorescent tubes, are most often configured as long, thin tubes and cannot be made as small point like sources. Fluorescent tubes that emit red, green, and blue light can be made and easily mounted next to one another in banks. They can also be made to emit light in short bursts.

In the case of linear light sources, operating behind a typical LCD, it is best to mount them horizontally so that the members of each set can flash sequentially from top to bottom, following the scan of the LCD rows in front of it. Of course, if the LCD is scanned from side to side column by column, then the tubes should be mounted vertically.

Figure 12:
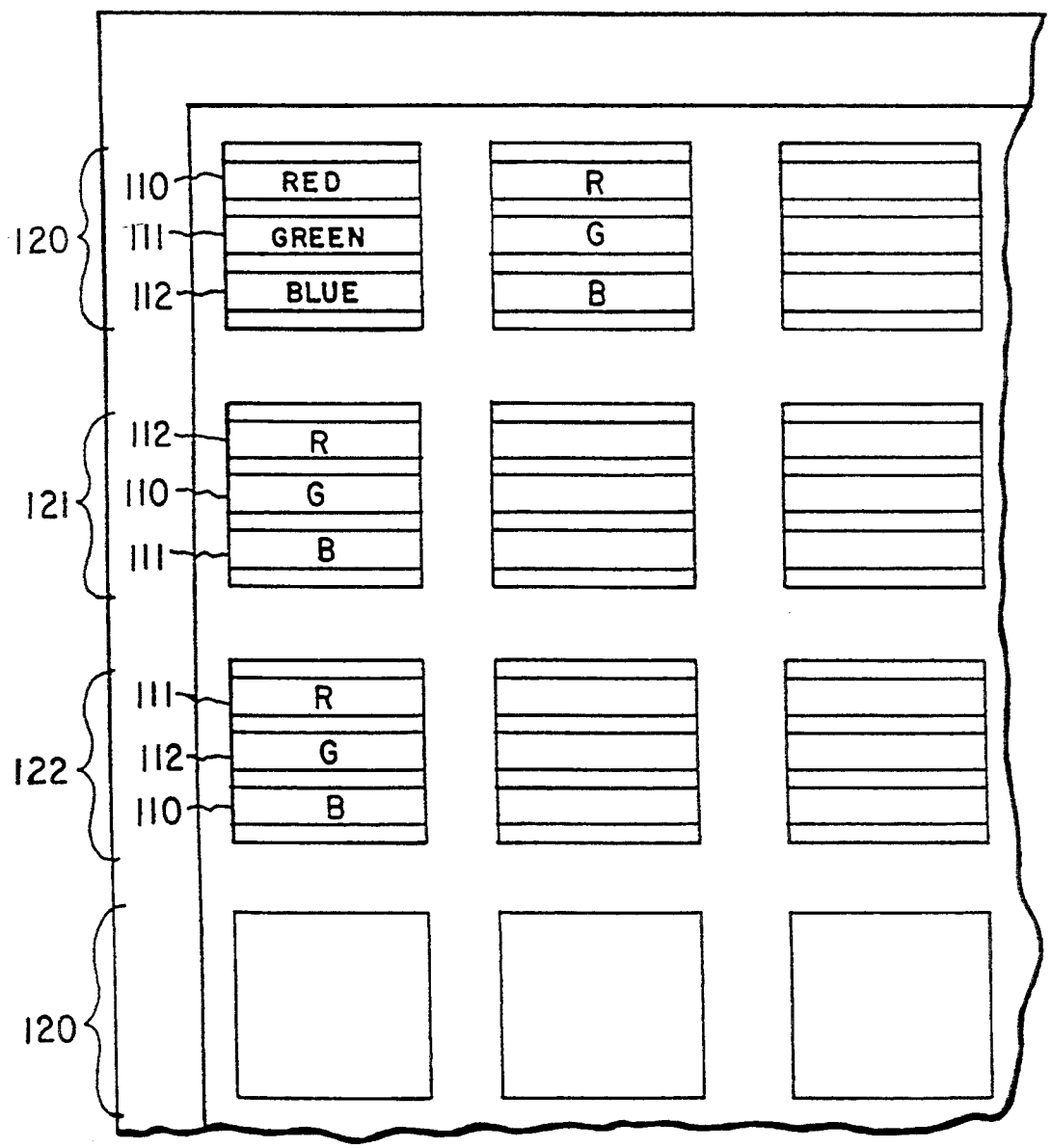
FIG. 12 is a magnified view of part of an LCD illustrating how linear subregions of pixels can be illuminated in a certain spatial pattern and in a certain temporal sequence.

An interlace pattern that can be produced with linear light sources and its illumination sequence are shown in FIG. 12. Red, blue and green horizontal lines are projected into each row of pixels as shown.

At the end of the first scan, after the pixels have been allowed to change to a new desired state, all the lines 110 are flashed simultaneously into the pixels. Thus, a red line is flashed into rows of pixels 120, a green line is flashed into rows of pixels 121 and a blue line is flashed into rows 122. Note that the RGB lines appear in different positions within the pixels. The pixels of rows 120 are, of course, in the appropriate states of transparency to form the red component of those rows of an image; correspondingly, the rows of pixels 121 are controlled to form the green component in those rows, and the rows of pixels 122 form rows of the blue component of the image.

After the LCD has been re-scanned and the pixels allowed to change their state again, a green line is flashed into the rows of pixels 120, a blue line into rows 121, and a red line into pixel rows 122. Again, pixels in each given row have the states appropriate to the color appearing in them. At the end of the next scan, after a new partial image has been generated on the LCD, a blue line is flashed into the pixel rows 120, a red line into the pixel rows 121, and a green line into the pixel rows 122.

The result is a full resolution, full color image in which the color lines are spatially interlaced.

Figure 13:
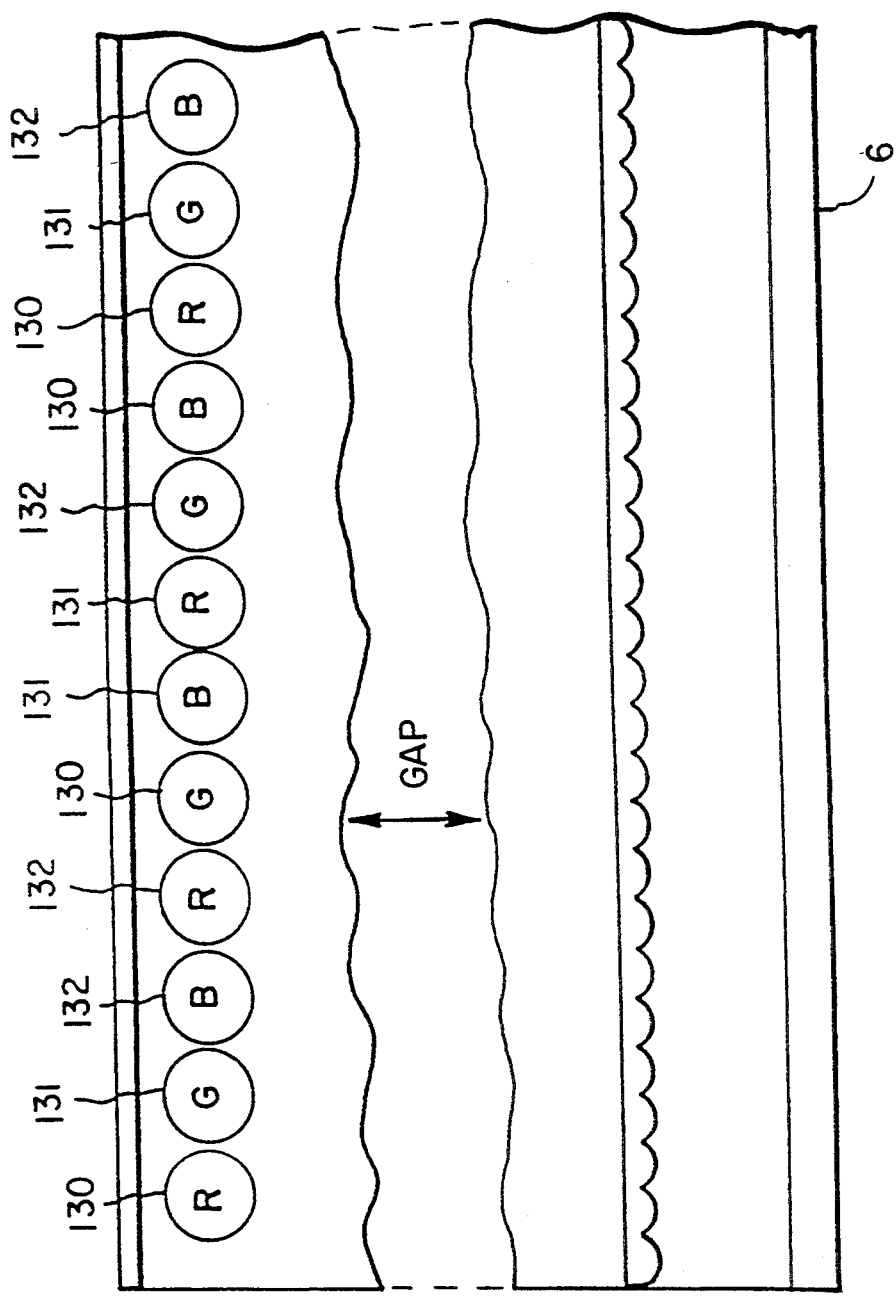
FIG. 13 is a magnified view of part of an illumination system that can be used to generate the pattern of FIG. 12.

FIG. 13, a side view, shows the lamp and lens arrangement that can be used to generate the line pattern and sequence of FIG. 12. A bank of linear lamps is mounted with red, green, and blue light emitting members placed vertically in the order shown. A lens sheet is mounted behind the LCD as before, with its lenslets ideally of about one focal length away from the pixel layer. When using linear light sources, one has the option of using a lenticular lens in place of the fly's eye lens discussed previously. A lenticular lens is generally easier and less costly to make than a fly's eye lens of the same size. The lenticular lens would possess an array of cylindrical lenslets spaced across its surface, parallel to the length of the linear light sources. Such a lens is shown in FIG. 13.

In either case, each lens must image light into three pixels, although in some configurations the lens may image light into more than three pixels. The lenses and the light sources must be of the correct size and spacing relative to one another so that each lens images light from each set of red, green, and blue lamps into the correct pixels.

The lamps are turned on in the following order in succession, as soon the section of the LCD in front of them has been addressed and its pixels have completed its change to their required states. Each lamp turns off a certain time period after turn on, so that it is completely off by the time the next address occurs. The lamps 130 turn at the same time to form the first set of light lines 110. Lamps 131 turn on after the next scan and pixel change to form the lines 111. Lamps 132 turn on at the same time to form lines 112.

As can be seen from the previous discussion, there are many types of spatial patterns and temporal illumination sequences that can be generated using the type of illumination systems and timing just described. The present application should be understood to encompass these other arrangements.

Various types of flashing light sources can be used to provide illumination for the displays of this invention including fluorescent lamps, gas filled arc lamps, gas filled plasma discharge devices, light emitting diodes, electroluminescent devices, electron excited phosphor displays such as cathode ray tubes, plasma displays, fluorescent displays and various steady light sources with light transmission controlling means such as arrays of liquid crystal light valves placed in front of them.

The forgoing description has been for the purpose of illustration and not limitation. Many other modifications and ramifications will naturally suggest themselves to those skilled in the art based on this disclosure. These are intended to be comprehended within the scope of this invention.

The embodiments of this invention in which an exclusive property or privilege is claimed are as follows:

1. A device for displaying an image by sequential, multi-monochromatic color illumination, comprising:
    an illuminator including a plurality of different monochromatic light sources for producing a plurality of different monochromatic colors of light;
    an array of light valves located in front of the illuminator and in optical alignment therewith;
    an electronic controller connected to the illuminator for setting each of the plurality of different monochromatic light sources in one of an on and an off state and for spatially and temporally multiplexing the plurality of different monochromatic colors;

a lens sheet disposed between the illuminator and the array of light valves for imaging the plurality of different monochromatic light sources in a plane adjacent the light valve array in which at least a portion of each of the light valves is illuminated by any one of the plurality of different monochromatic colors during a first illumination period in which all of the colors are displayed by the plurality of different monochromatic light sources, further wherein a different portion of each of the light valves is illuminated by a different one of the monochromatic colors during a second sequential illumination period in which all of the colors are displayed by the plurality of different monochromatic light sources, and still further wherein another different portion of each of the light valves is illuminated by another different one of the monochromatic colors during a third sequential illumination period in which all of the colors are displayed by the plurality of different monochromatic light sources, whereby after the third illumination period each light valve has been illuminated by all of the different monochromatic colors.

2. The display of claim 1 in which the light valve array comprises rows and columns of the light valves.

3. The display of claim 1 in which said multicolor light sources comprise sources of red, green and blue light.

4. The display of claim 1 in which the focussing means comprises a planar array of one of lenticular lenslets and fly's eye lenslets.

5. The display of claim 1 further comprising a non reflective, opaque barrier having a plurality of apertures, adjacent said light sources, wherein each aperture is aligned with one of the light sources.

6. The display of claim 1 further comprising a light baffle located between the light sources and the focussing means such that each light source illuminates a section of a correspondingly aligned light valve.

7. The display of claim 1 further comprising passive light diffusing means located between the focussing means and the light valve array.

8. The display of claim 1 in which the focussing means includes an anti-reflection coating on a surface thereof.

9. The display of claim 1 in which the light valve array is a liquid crystal display.

10. The display of claim 1 in which the light sources comprise point sources.

11. The display of claim 10 in which the light sources comprise light emitting diodes.

12. The display of claim 1 in which the light sources comprise linear sources.

13. The display of claim 12 in which the light sources comprise fluorescent lamps.

14. The display of claim 1 in which the light sources comprise gas filled arc lamps.

15. The display of claim 1 in which the light sources comprise gas filled plasma discharge devices.

16. The display of claim 1 in which the light sources comprise electroluminescent devices.

17. The display of claim 1 in which the light sources comprise light emitting areas on an electron excited phosphor display.

18. A method for field sequential color illumination of an image, comprising the steps of:

addressing each of a plurality of individually addressable light valves having adjustable transparency in a first time period to each display pan of a monochromatic color component of the image wherein said each monochromatic component includes any one of a plurality of monochromatic components, and illuminating each of said plurality of light valves during a first illumination period with one of a plurality of monochromatic colors of light so that at least a portion of each light valve is illuminated with the monochromatic color corresponding to the color component displayed by each said light valve during the first time period wherein all of the monochromatic colors are on for different light valves during said first illumination period;

addressing each of the plurality of light valves in a second sequential time period to each display a different part of the monochromatic color component of the image, and illuminating each of said plurality of light valves during a second sequential illumination period with another one of the plurality of monochromatic colors of light so that at least a portion of each light valve is illuminated with the monochromatic color corresponding to the color component displayed by each said light valve during the second time period wherein all of the monochromatic colors are on for different light valves during said second illumination period; and addressing each of the plurality of light valves in a third sequential time period to each display another different part of the monochromatic color component of the image, and illuminating each of said plurality of light valves during a third sequential illumination period with another one of the plurality of monochromatic colors of light so that at least a portion of each light valve is illuminated with the monochromatic color corresponding to the color component displayed by each said light valve during the third time period wherein all of the monochromatic colors are on for different light valves during said third illumination period, whereby after a cycle of the first, second and third illumination periods all portions of all of the light valves have been illuminated by all of the different monochromatic colors of light.

19. The method of claim 18 further comprising the step of imaging the plurality of multicolor light sources on a passive diffuser located adjacent the array.

20. The method of claim 18 further comprising the step of imaging the plurality of multicolor light sources onto, or immediately adjacent, a plane containing the light valve array.

21. The method of claim 20 in which the step of imaging the plurality of multicolor light sources comprises focussing the light into patterns of one of lines, line segments and points.

22. The method of claim 21 in which the step of focussing the light into patterns comprises the step of selectively illuminating subregions of the individual light valves.

23. The method of claim 18 further comprising the step of repeatedly addressing the array in one of a row by row and a column by column sequence, in which there is a finite time period between the address of any of the light valves and the adjustment of the transparency of the light valve due to the address, further in which the multicolor light sources remain in an on state between the time when the light valves have completed thier adjustment in transparency and when said light valves are addressed again.

24. The display of claim 18 in which each of the light valves comprises a subregion and further in which the focussing means further comprises means for illuminating the subregion of each of the light valves with light of a different color.

25. A method for field sequential color illumination for displaying an image, comprising the step of:

spatially and temporally interlacing a plurality of different monochromatic colors of light on an array of light valves in which each light valve is addressable to display one of a plurality of monochromatic color components of the image wherein the step further comprises addressing each light valve in a first time period to display a first monochromatic color component of the image wherein said first monochromatic component includes one of the plurality of monochromatic components, and illuminating each light valve during a first illumination period with one of the plurality of monochromatic colors of light so that at least a portion of each light valve is illuminated with the monochromatic color corresponding to the color component displayed by each said light valve during the first time period wherein all of the monochromatic colors are on for different light valves during said first illumination period;

addressing each light valve in a second sequential time period to display a different part of the monochromatic color component of the image, and illuminating each light valve during a second sequential illumination period with another one of the plurality of monochromatic colors of light so that a different portion of each light valve is illuminated with the monochromatic color corresponding to the color component displayed by each light valve during the second time period wherein all of the monochromatic colors are on for different light valves during said second illumination period; and addressing each light valve in a third sequential time period to display another different part of the monochromatic color component of the image, and illuminating each light valve during a third sequential illumination period with another one of the plurality of monochromatic colors of light so that another different portion of each light valve is illuminated with the monochromatic color corresponding to the color component displayed by each said light valve during the third time period wherein all of the monochromatic colors are on for the different light valves during said third illumination period, whereby after a cycle of the first, second and third illumination periods all portions of all of the light valves have been illuminated by all of the different monochromatic colors of light.

* * * * *